United States Patent [19]
Hee et al.

[11] Patent Number: 6,044,489
[45] Date of Patent: Mar. 28, 2000

[54] DATA SIGNAL BASELINE ERROR DETECTOR

[75] Inventors: Wong Hee, San Jose; Abhijit Phanse, Santa Clara, both of Calif.

[73] Assignee: National Semiconductor Corporation, Santa Clara, Calif.

[21] Appl. No.: 09/076,261

[22] Filed: May 12, 1998

Related U.S. Application Data

[60] Provisional application No. 60/069,027, Dec. 10, 1997, provisional application No. 60/069,044, Dec. 10, 1997, provisional application No. 60/069,031, Dec. 10, 1997, provisional application No. 60/069,091, Dec. 10, 1997, provisional application No. 60/069,030, Dec. 10, 1997, provisional application No. 60/069,028, Dec. 10, 1997, provisional application No. 60/067,764, Dec. 10, 1997, and provisional application No. 60/069,029, Dec. 10, 1997.

[51] Int. Cl.[7] .................................................. G11B 27/00
[52] U.S. Cl. ........................ 714/815; 714/812; 714/799
[58] Field of Search .................................... 714/815, 799, 714/812

[56] References Cited

U.S. PATENT DOCUMENTS

| | | | |
|---|---|---|---|
| 5,710,660 | 1/1998 | Yamamoto et al. | 359/341 |
| 5,850,514 | 12/1998 | Gonda et al. | 714/55 |

*Primary Examiner*—Phung M. Chung
*Attorney, Agent, or Firm*—Limbach & Limbach L.L.P.

[57] ABSTRACT

A data signal baseline error detector for monitoring and detecting undesired shifts in the baseline, or other intermediate level, of a multilevel data signal, such as an MLT3 Ethernet signal, as well as correcting for DC or low frequency offsets within a data receiving system. A signal slicing circuit generates two control signals: a data baseline signal indicates whether the data signal level is above or below a predetermined baseline reference level; and a data zero signal indicates when the data signal is in its zero, i.e., baseline, state and, when asserted, initiates a count sequence by a counter. The count sequence is decoded and the resulting decoded pulse sequence is gated in accordance with the data zero signal. Such pulses can be used to control a sampling circuit for sampling the data baseline signal or, alternatively, for sampling the data signal directly while in its zero state. The gating of the decoded pulses is done in such a manner as to prevent the outputting of decoded pulses which would otherwise occur too closely to the rising or falling edge of the data signal as it transitions away from its zero state, thereby ensuring that any signal sampling done occurs only during the true zero, or baseline, state of the data signal and not during any periods of signal level transitions.

22 Claims, 4 Drawing Sheets

Microfiche Appendix Included
(3 Microfiche, 294 Pages)

DATA SIGNAL BASELINE ERROR DETECTOR

RELATED APPLICATIONS

This application claims the benefit of and incorporates herein by reference the following U.S. provisional patent applications:

Ser. No. 60/069,027, filed Dec. 10, 1997, entitled "Peak Error Detector"

Ser. No. 60/069,044, filed Dec. 10, 1997, entitled "Signal Gating Controller For Enhancing Convergency of MLT3 Data Receivers"

Ser. No. 60/069,031, filed Dec. 10, 1997, entitled "Digital Interface Circuit"

Ser. No. 60/069,091, filed Dec. 10, 1997, entitled "Digital Signal Processing Control Circuit For Controlling Corrections of Input Data Signal Errors"

Ser. No. 60/069,030, filed Dec. 10, 1997, entitled "Control Loop For Data Signal Baseline Correction"

Ser. No. 60/069,028, filed Dec. 10, 1997, entitled "Control Loop For Adaptive Equalization of a Data Signal"

Ser. No. 60/069,029, filed Dec. 10, 1997, entitled "Control Loop For Multilevel Sampling of a Data Signal"

Ser. No. 60/067,764, filed Dec. 10, 1997, entitled "Data Signal Baseline Error Detector"

A portion of the disclosure of this patent document contains material which is subject to copyright protection. The copyright owner has no objection to the facsimile reproduction by anyone of the patent document or the patent disclosure, as it appears in the patent and trademark office, patent file or records, but otherwise reserves all copyright rights whatsoever.

This application is submitted with a microfiche appendix containing copyrighted material, copyright 1996, National Semiconductor Corporation. Such appendix consists of 3 microfiche transparencies with a total of 293 frames.

BACKGROUND OF THE INVENTION

1. Field of the Invention

The present invention relates to circuits for detecting shifts in the DC component of an AC signal, an in particular, to circuits for detecting shifts in the baseline of a digital data signal having multiple discrete signal levels.

2. Description of the Related Art

Recovering data which has been transmitted over a long length of cable and through transformers at high data rates requires that such data be equalized in order to compensate for the signal degradation caused by the cable and transformer. Such signal equalization includes frequency compensation and/or DC, or baseline, restoration.

The dc restoration function is necessary to ensure that the equalized incoming signal is properly centered within the dynamic range of the data recovery system so as to allow for accurate signal slicing. The slicing function is performed to ensure that the incoming signal has been properly equalized and is also used to extract the data from the equalized signal.

SUMMARY OF THE INVENTION

A data signal level error detector in accordance with the present invention provides for the generation of an error signal during an intermediate level state of a multiple level digital signal, such as the zero state of an MLT3 signal. Such an error signal represents the error between the actual selected level of the incoming data signal and an estimated level. Such an error detector can be used advantageously in a baseline wander compensation circuit for a fast Ethernet transceiver.

A data signal level error detector in accordance with one embodiment of the present invention includes first and second data signal detection circuits. The first data signal detection circuit is configured to receive and detect an input data signal which includes multiple signal levels representing an N-level data signal and in accordance therewith provide a data level signal which is asserted when the input data signal level is within a predetermined range of values having a maximum value and a minimum value, and is de-asserted otherwise. The input data signal includes, associated therewith: a plurality of sequential intermediate signal levels; a first plurality of sequential extended signal levels each of which is positive with respect to a preceding one of the plurality of sequential intermediate signal levels; and a second plurality of sequential extended signal levels each of which is negative with respect to a preceding one of the plurality of sequential intermediate signal levels. The maximum value corresponds to a first value which is between a preceding one of the plurality of sequential intermediate signal levels and a preceding one of the first plurality of sequential extended signal levels, while the minimum value corresponds to a second value which is between a preceding one of the plurality of sequential intermediate signal levels and a preceding one of the second plurality of sequential extended signal levels. The second data signal detection circuit, coupled to the first data signal detection circuit, is configured to receive the data level signal and in accordance therewith provide one or more signal pulses during the assertion of the data level signal, wherein the one or more signal pulses are provided during a time period between the assertion and de-assertion of the data level signal.

These and other features and advantages of the present invention will be understood upon consideration of the following detailed description of the invention and the accompanying drawings.

DETAILED DESCRIPTION OF THE INVENTION

Figure 1:
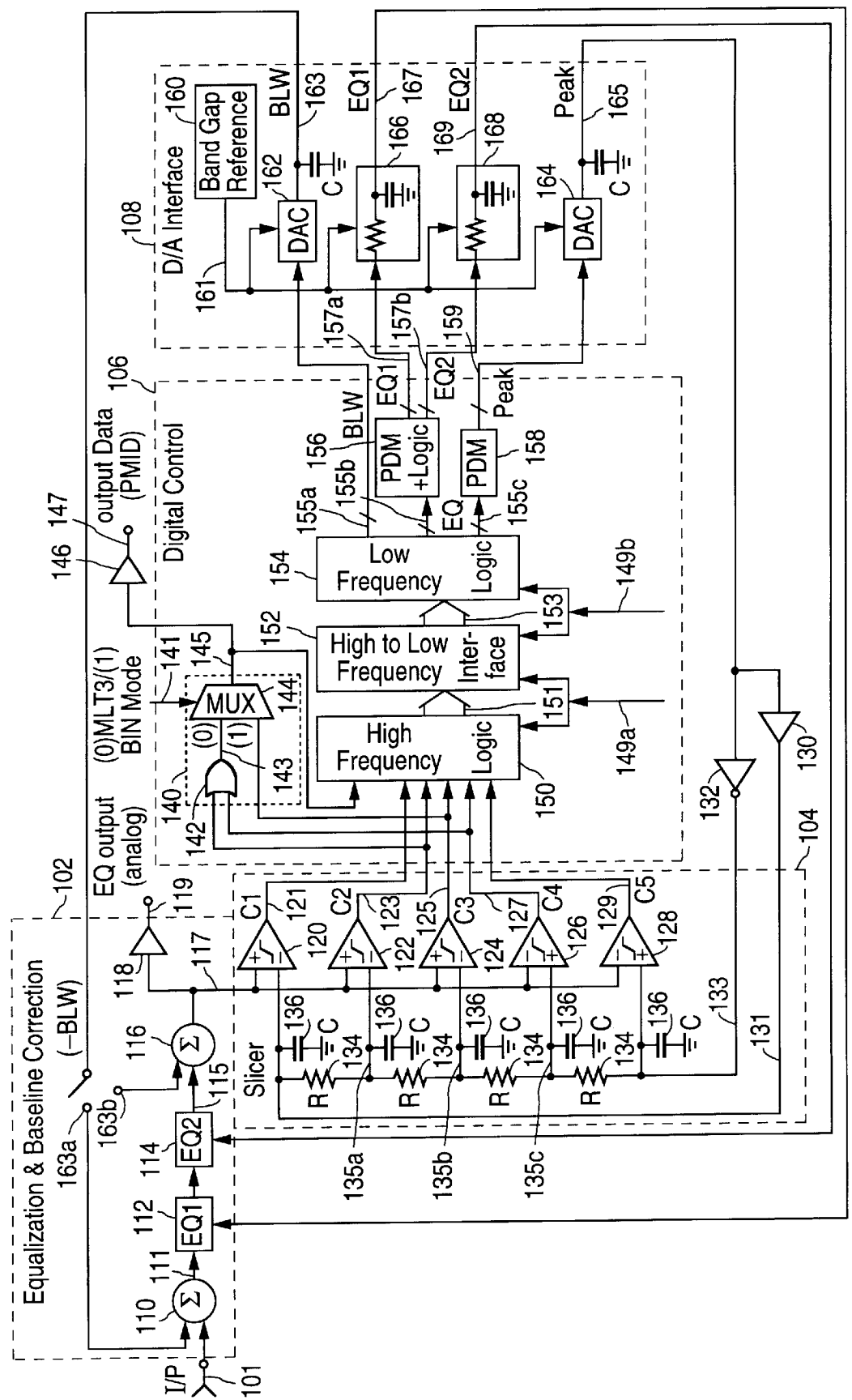
FIG. 1 is a functional block diagram of a high speed data receiver in which a data signal baseline error detector in accordance with the present invention can be advantageously used.

Referring to FIG. 1, a circuit in accordance with the present invention is advantageous for use in a high speed data receiver 100 which receives binary or MLT3 encoded data which has been transmitted via a cable (e.g., fast Ethernet). As discussed in more detail below, such a data receiver 100 provides adaptive equalization and dynamic slicing and baseline restoration of the data signal. (Each of the circuit functions or stages as represented in FIG. 1 and discussed below are described in detail in the code listings provided in the microfiche appendix hereto, the contents of which are incorporated herein by reference. A description of a similar data receiver can be found in co-pending, commonly assigned U.S. patent application Ser. No. 08/791,381, filed Jan. 30, 1997, and entitled "High Speed Data Receiver," the disclosure of which is incorporated herein by reference.)

This data receiver 100 includes a correction stage 102, a slicer stage 104, a digital control stage 106 and a digital-to-analog (D/A) interface 108. As discussed in more detail below, the correction stage 102 provides for equalization and baseline wander correction of the input data signal 101. The slicer stage 104 slices the resulting equalized, corrected data signal 117. The digital control stage 106 processes some of the sliced data signals to produce an output digital data signal 147, as well as generate a number of digital control signals 155a, 157a, 157b, 159 for controlling the equalization, baseline wander correction and slicing of the input data signal 101. The D/A interface 108 converts such digital control signals 155a, 157a, 157b, 159 into corresponding analog signals 163, 165, 167, 169 for actually providing such control of the equalization, baseline wander correction and slicing of the input data signal 101.

The incoming data signal 101, which has been received via a long cable of variable length (not shown), is selectively combined with a baseline correction signal 163 (discussed further below) in a signal summer 110. The corrected signal 111 is selectively amplified by a series of adaptive equalizers, 112, 114, which each have a signal gain which increases with frequency in accordance with their respective equalizer control signals 167, 169. The resulting equalized signal 115 is selectively combined with an alternative baseline correction signal 163 in another signal summer 116. (For testing purposes, the final equalized, corrected data signal 117 is buffered by an analog buffer amplifier 118 to be provided as an analog, equalized, corrected output data signal 119, and is also provided to the signal slicer 104.)

A description of a signal equalization technique using a series of signal equalizers in this manner can be found in co-pending, commonly assigned U.S. patent application Ser. No. 08/791,382, filed Jan. 30, 1997, and entitled "Multiple Stage Adaptive Equalizer," the disclosure of which is incorporated herein by reference.

The slicer 104 receives and slices the equalized, corrected data signal 117 in accordance with positive 131 and negative 133 data peak reference signals using a set of voltage comparators 120, 122, 124, 126, 128. The positive 131 and the negative 133 data peak reference signals are the buffered, non-inverted and inverted versions of a data peak signal 165 (discussed further below) as generated by non-inverting 130 and inverting 132 buffer amplifiers, respectively. These data peak reference signals 131, 133 are applied differentially across a resistive voltage divider with four resisters 134, thereby generating five respective reference signals 131, 135a, 135b, 135c, 133, each of which is filtered by a capacitor 136 for use as a reference signal for its respective voltage comparator 120, 122, 124, 126, 128. Based upon these reference signals, 131, 135a, 135b, 135c, 133, each comparator 120, 122, 124, 126, 128 produces a respective binary output signal 121, 123, 125, 127, 129, each of which is asserted at a logic one level when the data signal 117 transcends the value of the corresponding reference input signal 131, 135a, 135b, 135c, 133.

For example, for the positive 120 and negative 128 peak voltage comparators, the positive 131 and negative 133 data peak reference signals serve as their reference signals, respectively. The middle reference signal 135b represents the mean (e.g., zero or baseline) and serves as the reference signal for the middle comparator 124. The remaining positive reference signal 135a represents a voltage between the mean voltage 135b and the positive peak voltage 131 and serves as the reference for the positive level comparator 122. Similarly, the remaining negative reference 135c represents a voltage between the mean voltage 135b and the negative peak voltage 133 and serves as the reference for the negative level comparator 126.

The binary data signals 121, 123, 125, 127, 129 are received and processed by the digital control stage 106 as follows. The mean 125, positive 123 and negative 127 data signals are processed by a decoder 140 to produce a data signal 145 which is buffered by a buffer amplifier 146 to produce the output digital data signal 147. The positive 123 and negative 127 data signals are logically summed in an OR Gate 142. Then, either the resulting logical sum signal 143 or mean data signal 125 is selected with a multiplexor 144 in accordance with a control signal 141, depending upon whether the original input data signal 101 is an MLT3 or binary signal. This data signal 145 and the binary data signals 121, 123, 125, 127, 129 are received and processed by a high frequency logic stage 150 in accordance with a high frequency clock signal 149a.

The high frequency logic stage 150 processes its input signals 145, 121, 123, 125, 127, 129 in a number of ways to produce a set 151 of digital signals which are then converted to a corresponding set 153 of digital signals at a lower frequency by the high-to-low frequency stage 152 in accordance with the high frequency clock signal 149a and a low frequency clock signal 149b. (By way of example, for fast Ethernet, the high frequency clock signal 149a has a frequency in the hundreds of megahertz and the low frequency clock signal 149b has a frequency in the tens of megahertz.) As discussed in more detail below, one operation performed by the high frequency logic stage 150 is that of baseline error detection, whereby a baseline error signal which is generated during an intermediate level state of the multiple level data signal 117 (such as the zero-state of an MLT3 signal) is validated, thereby identifying the occurrence of an error between the baseline of the incoming data signal and an estimated baseline level.

Another operation performed is that of peak error detection, whereby multiple peak error signals representing variations in the signal peaks within selected frequency bands of the incoming data signal are generated and validated so as to identify the occurrence of errors between the peak of the present incoming data signal and estimated peak values of prior incoming data signals within different time windows. A description of this peak error detector can be found in co-pending, commonly assigned U.S. patent application Ser. No. 09/076,186, filed May 12, 1998, and entitled "Peak Error Detector" (attorney docket no. NSC1-A9010), the disclosure of which is incorporated herein by reference. Yet another operation performed is that of generating gating control signals for gating out false signal pulses caused by improper equalization of the original incoming data signal 101. A description of this gating control circuit can be found in co-pending, commonly assigned U.S. patent application Ser. No. 09/076,425, filed May 12, 1998, and entitled "Signal Gating Controller for Enhancing Convergency of MLT3 Data Receivers" (attorney docket no. NSC1-C0310), the disclosure of which is incorporated herein by reference.

The low frequency logic stage 154, in accordance with the low frequency clock signal 149b, processes these lower frequency signals 153 to produce a number of digital control signals 155a, 155b, 155c. More specifically, the low frequency logic stage 154 processes the lower frequency error signals 153 to produce control signals for compensating for variations in peak signal values and correcting errors in the baseline of the incoming data signal 111/115, as well as controlling the equalization of the incoming data signal 111. A more detailed description of the low frequency logic stage 154 can be found in co-pending, commonly assigned U.S. patent application Ser. No. 09/076,187, filed May 12, 1998, and entitled "Distributive Encoder For Encoding Error Signals Which Represent Signal Peak Errors In Data Signals For Identifying Erroneous Signal Baseline, Peak And Equalization Conditions" (attorney docket no. NSC1-C0610), the disclosure of which is incorporated herein by reference.

The high-to-low frequency interface 152, in accordance with the high 149a and low 149b frequency clock signals, converts the incoming error signals 151 to a corresponding set 153 of lower frequency error signals. A more detailed description of this interface 152 can be found in co-pending, commonly assigned U.S. patent application Ser. No. 09/076,263, filed May 12, 1998, and entitled "Digital Interface Circuit" (attorney docket no. NSC1-C0510), the disclosure of which is incorporated herein by reference.

One set 155a of control signals produced by the low frequency logic stage 154 is used for correcting baseline wander of the original input data signal 101. This set 155a of digital signals is converted to an analog baseline wander control signal 163 by way of a digital-to-analog converter 162. This analog control signal 163 is then summed with either the original input data signal 101 or the equalized input data signal 115, as discussed above.

Another set 155b of control signals is used to generate the equalization control signals 167, 169 for the adaptive equalizers 112, 114 (discussed above). This set 155b of signals is processed using a circuit 156 which includes a pulse density modulator and some associated logic circuitry to produce, in turn, two pulse density modulated control signals 157a, 157b for controlling the two adaptive input signal equalizers 112, 114. Each of these signals 157a, 157b is converted to its respective analog control signal 167, 169 with a resistive-capacitive digital-to-analog conversion circuit 166, 168. A more detailed description of this signal converter can be found in co-pending, commonly assigned U.S. patent application Ser. No. 08/791,367 filed Jan. 30, 1997, and entitled "Distributive Digital-to-Analog Converter," the disclosure of which is incorporated herein by reference.

Yet another set of control signals 155c is used to generate an analog peak signal 165 which is used to generate the differential peak reference signals 131, 133 for the slicer 104, as discussed above. These digital signals 155c are converted with a pulse density modulator 158 to produce a set 159 of pulse density modulated signals which, in turn, are then converted to the analog peak signal 165 by a digital-to-analog converter 164.

Figure 2:
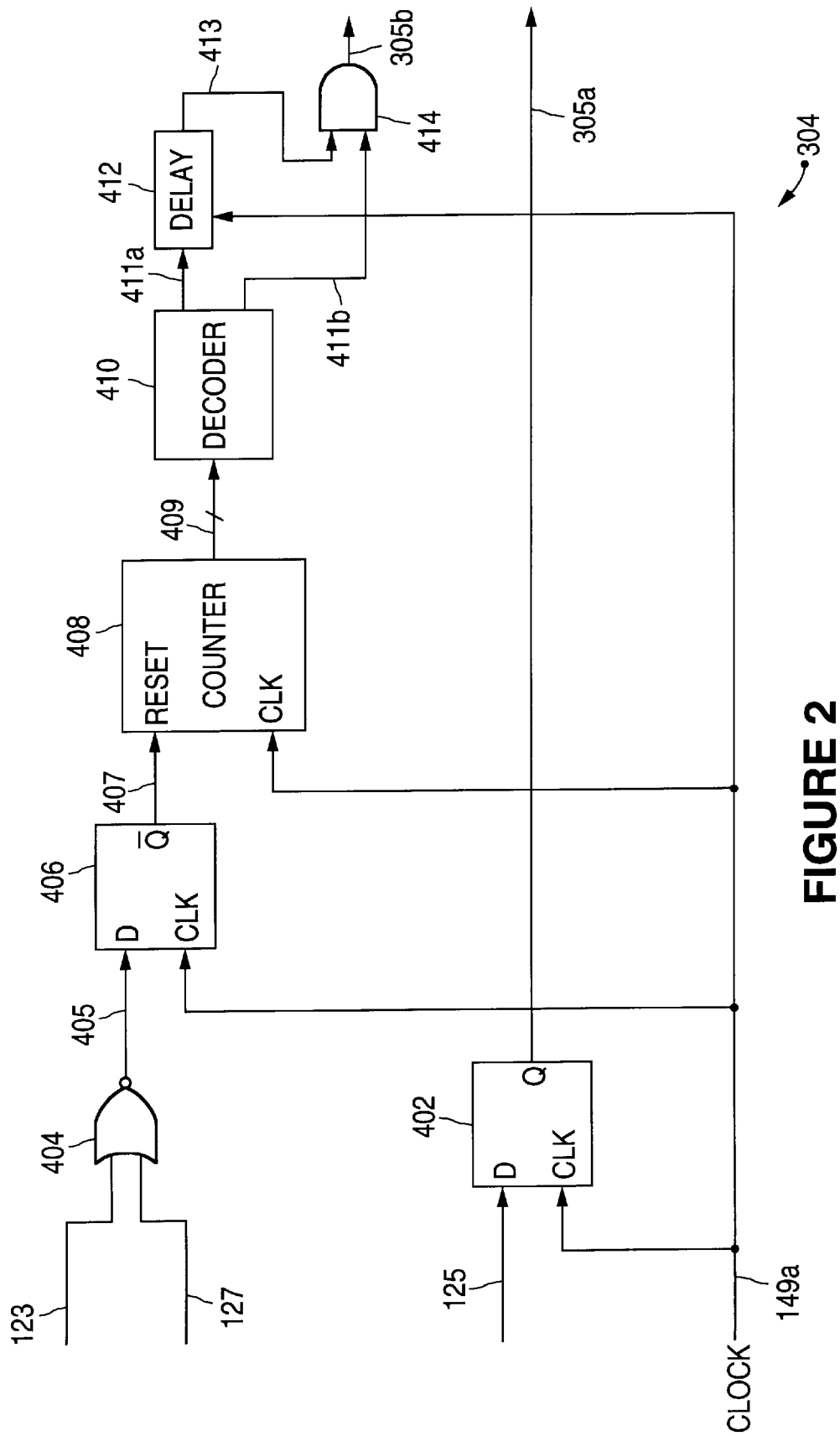
FIG. 2 is a schematic diagram of a data signal baseline error detector in accordance with one embodiment of the present invention.

Referring to FIG. 2, a data signal baseline error detector 304 in accordance with one embodiment of the present invention includes digital logic which forms the following functional logic blocks: a NOR gate 404, two D-type flip-flops 402, 406, a counter 408, a decoder 410, a delay line 412 and an AND gate 414, all interconnected substantially as shown. The mean data signal 125 from the signal slicer (FIG. 1) is latched in a flip-flop 402 which is clocked by a clock signal 149a. The positive data signal 123 and negative data signal 127 are logically NORed in the NOR gate 404, with the result 405 then being latched in a flip-flop 406. The inverted output 407 is used to control the resetting of the counter 408. The count sequence signals 409 are decoded by the decoder 410 to produce a serial stream of signal pulses 411a and a gating signal 411b. The signal pulse stream 411a is delayed in the clocked delay line 412, with the delayed result 413 being gated by the gating signal 411b in the AND gate 414. The resulting output 305b, when asserted, indicates that the baseline error signal 305a is valid. The latched output 305a, when asserted, indicates that the baseline of the input data signal 117 is higher than the baseline of the preceding input data. (These baseline error 305a and gated data zero validation 305b signals are used to generate part of the aforementioned set 155a of baseline wander correction control signals.)

Figure 3:
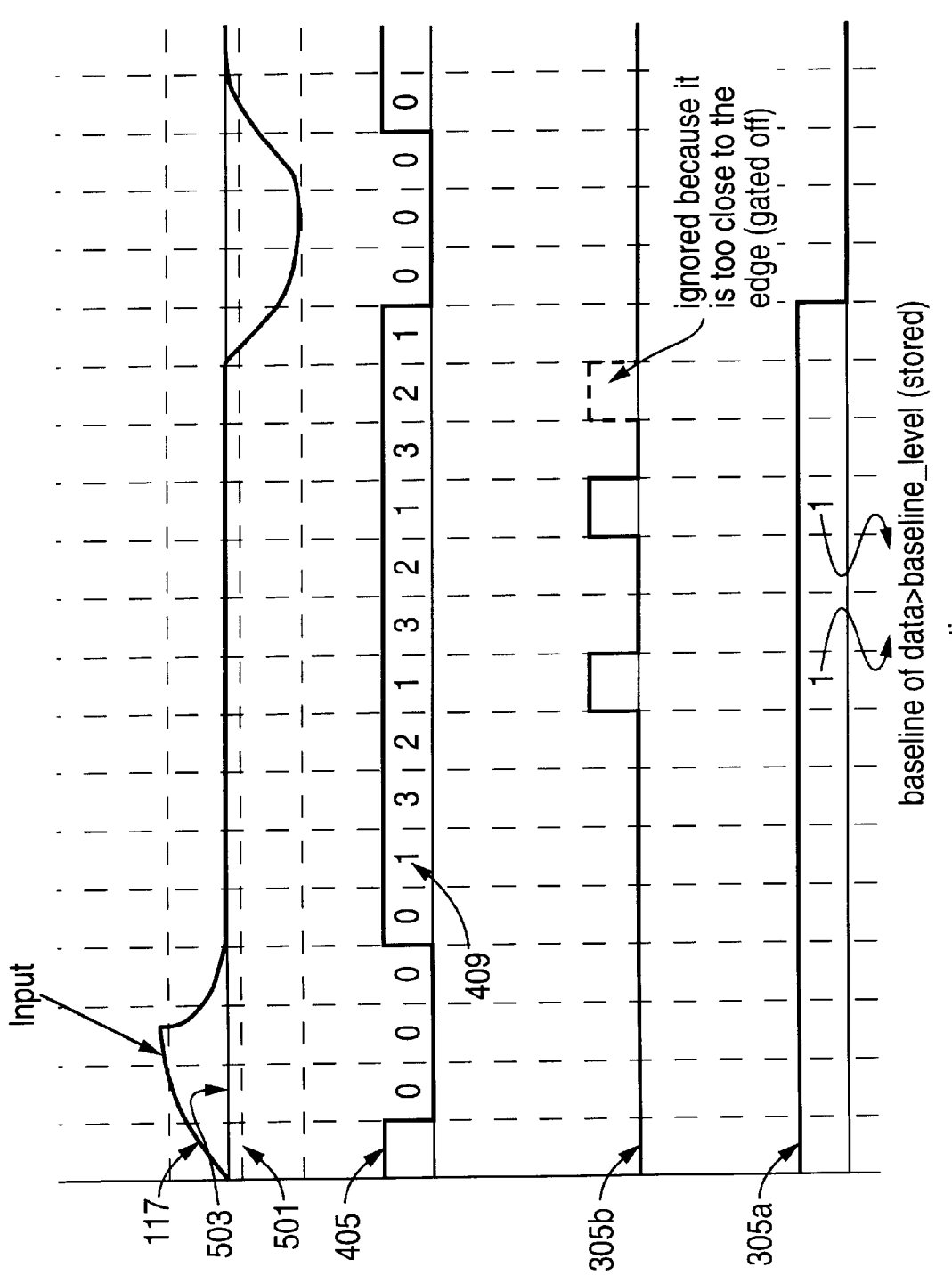
FIG. 3 is a signal timing diagram for the circuit of FIG. 2.

Referring to FIG. 3, the operation of the baseline error detector 304, in cooperation with the signal slicer, can be explained as follows. The mean data signal 125 is latched with the resulting signal 305a used to represent the error between the baseline 501 of the present input data signal 117 and the baseline 503 of the preceding data. When the output 305a is at a logic 1, the level of the present input data signal 117 is greater than the baseline 501 of the preceding input data signal 117. Conversely, when the latched output 305a is at a logic zero, the level of the present input data signal 117 is less than the baseline 501 of the preceding data signal 117.

When the input data signal is not in its intermediate (e.g., zero) state, the counter 408 is reset to zero and provides a zero count sequence 409. During the intermediate state of the input data signal 117, the reset control signal 407 is de-asserted and the counter 408 begins counting from zero. The count sequence 409 from the counter 408 counts in accordance with a grey code count: 0132132132 . . . A data zero validation signal 411a is asserted by the decoder 410 after the count sequence equals "2." The delayed version 413 of this signal 411a is gated with the gating signal 411b which prevents the delayed signal 413 from being outputted when it occurs too close to the trailing edge of the input data signal 117. For example, when the zero signal state is about to end, the gating signal 411b from the decoder 410 is asserted at a logic zero, thereby gating off the delayed data zero validation signal 413. Conversely, when the data zero validation signal 413 is not too close to the edge, i.e., it occurs closer to the middle of a zero state, the gating signal 411b remains at a logic 1. Accordingly, the gated data zero validation signal 305b identifies those points in time when the latched mean signal 305a corresponds to the intermediate, e.g., zero, state of the data signal 117. Also, the frequency of the gated data zero validation signal 305b is dependent upon the amount of information desired about the intermediate state of the data signal 117. For example, by increasing the frequency of the clock signal 149a, the number of count sequences 409 completed by the counter 408 during the intermediate state of the input data signal 117 (when the reset control signal 407 is de-asserted) can be increased, thereby producing an increased number of assertions of the data zero validation signal 411a.

Figure 4:
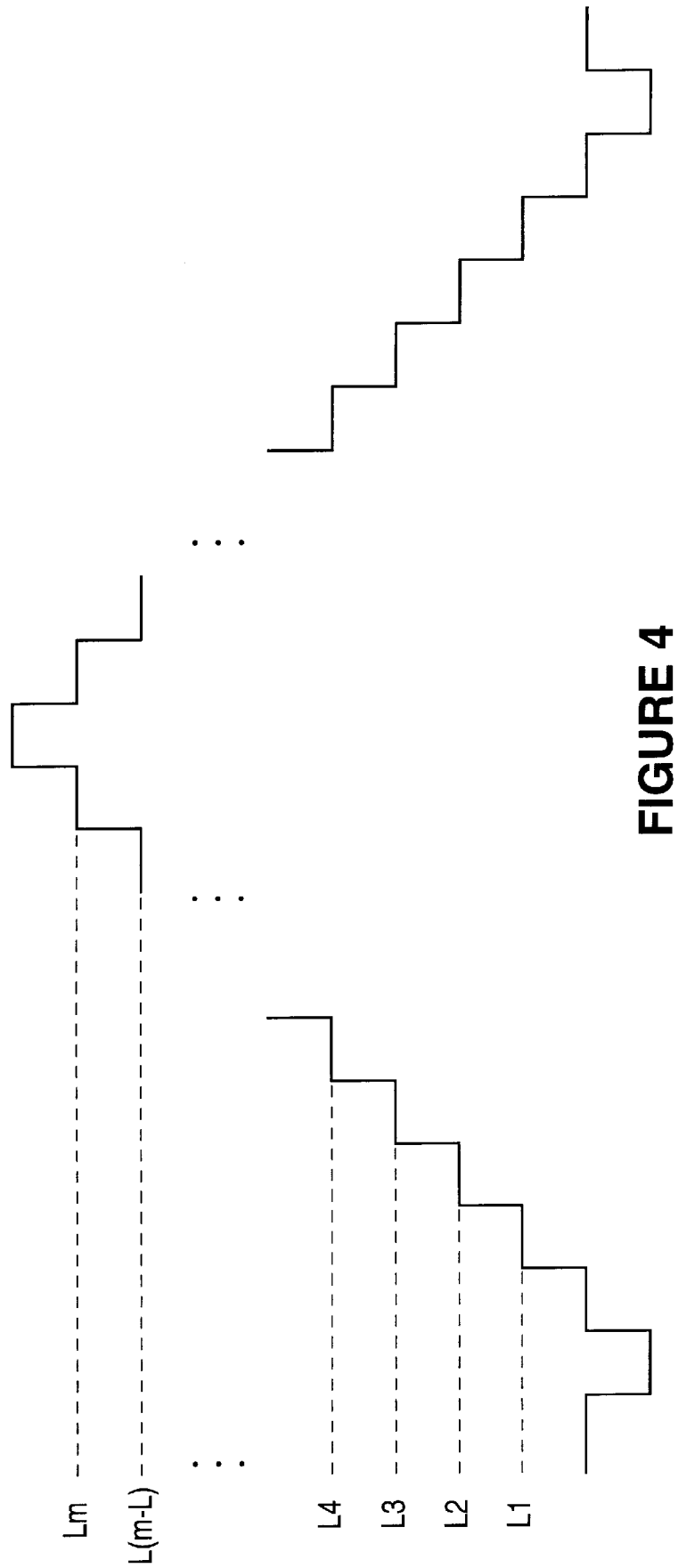
FIG. 4 illustrates an N-level data signal having multiple discrete intermediate signal levels each of which can be monitored for errors with a data signal baseline error detector in accordance with the present invention.

Referring to FIG. 4, as should be evident from the foregoing discussion, a data signal baseline error detector implemented in accordance with the principles of the present invention can be used for selectively monitoring any of the individual discrete intermediate levels L1, L2, . . . , Lm of an N-level data signal for errors. Accordingly, for such a signal, those portions of the foregoing discussion concerning "zero" or "baseline" levels of the input data signal would be references to the particular individual discrete intermediate level of the N-level data signal which has been selected for monitoring for errors.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a data signal level error detector, comprising:

a first data signal detection circuit configured to receive and detect an input data signal which includes a plurality of signal levels representing an N-level data signal and in accordance therewith provide a first data level signal which is asserted when said input data signal level is within a predetermined range of values having a maximum value and a minimum value, and is de-asserted otherwise, wherein said input data signal includes, associated therewith,
a plurality of sequential intermediate signal levels,
a first plurality of sequential extended signal levels each of which is positive with respect to a preceding one of said plurality of sequential intermediate signal levels, and
a second plurality of sequential extended signal levels each of which is negative with respect to a preceding one of said plurality of sequential intermediate signal levels, said maximum value corresponds to a first value which is between a preceding one of said plurality of sequential intermediate signal levels and a preceding one of said first plurality of sequential extended signal levels, and said minimum value corresponds to a second value which is between a preceding one of said plurality of sequential intermediate signal levels and a preceding one of said second plurality of sequential extended signal levels; and a second data signal detection circuit, coupled to said first data signal detection circuit, configured to receive said first data level signal and in accordance therewith provide one or more signal pulses during said assertion of said first data level signal, wherein said one or more signal pulses are provided during a time period between said assertion and said de-assertion of said first data level signal.

2. The apparatus of claim 1, wherein said first data signal detection circuit is further configured to receive and detect said input data signal and in accordance therewith provide a second data level signal which is asserted when said input data signal level extends beyond a preceding one of said plurality of sequential intermediate signal levels and is de-asserted when said input data signal level does not extend beyond a preceding one of said plurality of sequential intermediate signal levels.

3. The apparatus of claim 2, wherein:

said second data level signal includes first and second signal states which indicate when said input data signal level is more positive and more negative, respectively, than said preceding one of said plurality of sequential intermediate signal levels; and said one or more signal pulses indicate a valid state of said first and second signal states of said second data level signal.

4. The apparatus of claim 3, wherein said one or more signal pulses include one or more baseline error pulses which represent one or more signal baseline errors in said input data signal.

5. The apparatus of claim 4, wherein said time period between said assertion and said de-assertion of said first data level signal begins after said assertion of said first data level signal and terminates a predetermined time period prior to said de-assertion of said first data level signal.

6. The apparatus of claim 5, wherein said second data signal detection circuit comprises:

a counter configured to receive said first data level signal and in accordance therewith provide a count sequence signal during said assertion of said first data level signal; and a decoder, coupled to said counter, configured to receive and decode said count sequence signal and in accordance therewith provide a pulsed signal.

7. The apparatus of claim 6, wherein:

said decoder is further configured to detect said assertion and de-assertion of said first data level signal and in accordance therewith provide a gating control signal; and said second data signal detection circuit further comprises
a delay circuit, coupled to said decoder, configured to receive and delay said pulsed signal and in accordance therewith provide a delayed pulsed signal, and
a gating circuit, coupled to said decoder and said delay circuit, configured to receive said gating control signal and in accordance therewith receive and gate said delayed pulsed signal and in accordance therewith provide said one or more signal pulses.

8. The apparatus of claim 1, wherein said first data signal detection circuit comprises:

a reference signal source configured to provide first and second reference signals having first and second reference signal values which correspond to said maximum and minimum values, respectively; and a signal comparison circuit, coupled to said reference signal source, configured to receive and compare said input data signal with said first and second reference signals.

9. The apparatus of claim 8, wherein:

said reference signal source comprises a voltage divider circuit configured to receive and divide first and second voltages having values which correspond to a preceding one of said first plurality of sequential extended signal levels and a preceding one of said second plurality of sequential extended signal levels, respectively, and in accordance therewith provide first and second reference voltages as said first and second reference signals, respectively; and said signal comparison circuit comprises first and second voltage comparators, coupled to said voltage divider circuit, configured to receive and compare said input data signal with said first and second reference voltages, respectively.

10. The apparatus of claim 1, wherein said second data signal detection circuit comprises:

a counter configured to receive said first data level signal and in accordance therewith provide a count sequence signal during said assertion of said first data level signal; and a decoder, coupled to said counter, configured to receive and decode said count sequence signal and in accordance therewith provide a pulsed signal.

11. The apparatus of claim 10, wherein:

said decoder is further configured to detect said assertion and de-assertion of said first data level signal and in accordance therewith provide a gating control signal; and said second data signal detection circuit further comprises
a delay circuit, coupled to said decoder, configured to receive and delay said pulsed signal and in accordance therewith provide a delayed pulsed signal, and
a gating circuit, coupled to said decoder and said delay circuit, configured to receive said gating control signal and in accordance therewith receive and gate said delayed pulsed signal and in accordance therewith provide said one or more signal pulses.

12. A method of data signal level error detection, comprising the steps of:

receiving and detecting an input data signal which includes a plurality of signal levels representing an N-level data signal and in accordance therewith generating a first data level signal which is asserted when said input data signal level is within a predetermined range of values having a maximum value and a minimum value, and is de-asserted otherwise, wherein said input data signal includes, associated therewith,
a plurality of sequential intermediate signal levels,
a first plurality of sequential extended signal levels each of which is positive with respect to a preceding one of said plurality of sequential intermediate signal levels, and
a second plurality of sequential extended signal levels each of which is negative with respect to a preceding one of said plurality of sequential intermediate signal levels, said maximum value corresponds to a first value which is between a preceding one of said plurality of sequential intermediate signal levels and a preceding one of said first plurality of sequential extended signal levels, and said minimum value corresponds to a second value which is between a preceding one of said plurality of sequential intermediate signal levels and a preceding one of said second plurality of sequential extended signal levels; and receiving said first data level signal and in accordance therewith generating one or more signal pulses during said assertion of said first data level signal, wherein said one or more signal pulses are generated during a time period between said assertion and said de-assertion of said first data level signal.

13. The method of claim 12, further comprising the step of receiving and detecting said input data signal and in accordance therewith generating a second data level signal which is asserted when said input data signal level extends beyond a preceding one of said plurality of sequential intermediate signal levels and is de-asserted when said input data signal level does not extend beyond a preceding one of said plurality of sequential intermediate signal levels.

14. The method of claim 13, wherein:

said second data level signal includes first and second signal states which indicate when said input data signal level is more positive and more negative, respectively, than said preceding one of said plurality of sequential intermediate signal levels; and said one or more signal pulses indicate a valid state of said first and second signal states of said second data level signal.

15. The method of claim 14, wherein said one or more signal pulses include one or more baseline error pulses which represent one or more signal baseline errors in said input data signal.

16. The method of claim 15, wherein said time period between said assertion and said de-assertion of said first data level signal begins after said assertion of said first data level signal and terminates a predetermined time period prior to said de-assertion of said first data level signal.

17. The method of claim 16, wherein said step of receiving said first data level signal and in accordance therewith generating one or more signal pulses during said assertion of said first data level signal comprises:

receiving said first data level signal and in accordance therewith generating a count sequence signal during said assertion of said first data level signal; and decoding said count sequence signal and in accordance therewith generating a pulsed signal.

18. The method of claim 17, further comprising the steps of:

detecting said assertion and de-assertion of said first data level signal and in accordance therewith generating a gating control signal;

delaying said pulsed signal and in accordance therewith generating a delayed pulsed signal; and receiving said gating control signal and in accordance therewith receiving and gating said delayed pulsed signal and in accordance therewith generating said one or more signal pulses.

19. The method of claim 12, wherein said step of receiving and detecting an input data signal which includes a plurality of signal levels representing an N-level data signal and in accordance therewith generating a first data level signal which is asserted when said input data signal level is within a predetermined range of values having a maximum value and a minimum value, and is de-asserted otherwise, comprises:

generating first and second reference signals having first and second reference signal values which correspond to said maximum and minimum values, respectively; and comparing said input data signal with said first and second reference signals.

20. The method of claim 19, wherein:

said step of generating first and second reference signals having first and second reference signal values which correspond to said maximum and minimum values, respectively, comprises receiving and dividing first and second voltages having values which correspond to a preceding one of said first plurality of sequential extended signal levels and a preceding one of said second plurality of sequential extended signal levels, respectively, and in accordance therewith generating first and second reference voltages as said first and second reference signals, respectively; and said step of comparing said input data signal with said first and second reference signals comprises comparing said input data signal with said first and second reference voltages, respectively.

21. The method of claim 12, wherein said step of receiving said first data level signal and in accordance therewith generating one or more signal pulses during said assertion of said first data level signal comprises:

receiving said first data level signal and in accordance therewith generating a count sequence signal during said assertion of said first data level signal; and decoding said count sequence signal and in accordance therewith generating a pulsed signal.

22. The method of claim 21, wherein:

said method further comprises the step of detecting said assertion and de-assertion of said first data level signal and in accordance therewith generating a gating control signal; and said step of receiving said first data level signal and in accordance therewith generating one or more signal pulses during said assertion of said first data level signal further comprises receiving and delaying said pulsed signal and in accordance therewith generating a delayed pulsed signal, and receiving said gating control signal and in accordance therewith receiving and gating said delayed pulsed signal and in accordance therewith generating said one or more signal pulses.

* * * * *